(12) United States Patent
Deeds

(10) Patent No.: US 7,142,893 B2  
(45) Date of Patent: Nov. 28, 2006

(54) APPARATUS, AND ASSOCIATED METHOD, FOR FACILITATING IDENTIFICATION OF A MOBILE TELEPHONE

(75) Inventor: Douglas Deeds, Bedford, TX (US)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 10/427,725

(22) Filed: May 1, 2003

(65) Prior Publication Data

US 2004/0219953 A1  Nov. 4, 2004

(51) Int. Cl.  
*H04M 1/00* (2006.01)  
*H04B 1/38* (2006.01)

(52) U.S. Cl. .................... 455/567; 455/550.1

(58) Field of Classification Search ........... 455/90.3, 455/572, 550.1, 575.1, 567, 418, 575.8; 379/373.03, 379/374.01, 252  
See application file for complete search history.

(56) References Cited

U.S. PATENT DOCUMENTS

| | | | |
|---|---|---|---|
| 4,866,766 A * | 9/1989 | Mitzlaff | 379/373.02 |
| 5,452,354 A * | 9/1995 | Kyronlahti et al. | 379/252 |
| 5,881,147 A * | 3/1999 | Kim | 379/373.03 |
| 6,418,330 B1 * | 7/2002 | Lee | 455/567 |
| 6,501,967 B1 * | 12/2002 | Makela et al. | 455/567 |
| 7,020,497 B1 * | 3/2006 | Deeds | 455/567 |
| 2001/0014616 A1 * | 8/2001 | Matsuda et al. | 455/567 |
| 2001/0051536 A1 * | 12/2001 | Muramatsu | 455/567 |
| 2002/0094806 A1 * | 7/2002 | Kamimura | 455/567 |
| 2004/0131175 A1 * | 7/2004 | Rogalski et al. | 379/373.03 |
| 2004/0203508 A1 * | 10/2004 | Cauwels et al. | 455/90.3 |
| 2004/0204146 A1 * | 10/2004 | Deeds | 455/567 |
| 2005/0090280 A1 * | 4/2005 | Nielsen | 455/550.1 |

* cited by examiner

*Primary Examiner*—Aung Moe  
(74) *Attorney, Agent, or Firm*—Banner & Witcoff, Ltd.

(57) ABSTRACT

A method for facilitating identification of a telephone, whereby a determination is made whether a custom ring tune has been set for the mobile telephone. If it is determined that a custom ring tune has been set for the mobile telephone, then the custom ring tune is generated. If it is determined that a custom ring tune has not been set for the mobile telephone, then a unique identifier of the mobile telephone is determined, a ring tune corresponding to the unique identifier is determined, and the ring tune corresponding to the unique identifier is generated. Thus, a mobile telephone may generate a distinct ring tune without requiring a user to program such a distinct ring tune.

22 Claims, 14 Drawing Sheets

APPARATUS, AND ASSOCIATED METHOD, FOR FACILITATING IDENTIFICATION OF A MOBILE TELEPHONE

TECHNICAL FIELD

The invention relates generally to wireless telecommunications and, more particularly, to an apparatus and method for implementing a default ring tune that is activated upon receipt of an incoming call, the holding of a keypress, or power-on of a mobile telephone, when a user does not otherwise select a ring tune.

BACKGROUND

Telephones typically generate an audible ring to alert a user when there is an incoming call to be answered. In the case of wireline telephones, which are generally fixed in a particular physical location, there is generally little or no question regarding who the telephone belongs to and, hence, who should answer the telephone when it generates an audible ring indicative of an incoming call. However, in the case of a wireless mobile telephone, also referred to as a mobile phone, mobile station, cellular telephone, cell phone, mobile handset, handset, and particularly in cases where there are multiple wireless mobile telephones, each of which are located within an audible range of the owner of each other mobile telephone, there may be uncertainty about which mobile telephone is ringing when there is an incoming call. In many cases, the owner of a ringing mobile telephone, thinking it is another owner's mobile telephone that is ringing, may not answer his/her own mobile telephone when it is ringing and, as a result, miss a call.

In an effort to assist owners, or users, of mobile telephones to recognize when their mobile telephone is ringing, many mobile telephones allow a user to select, program, or download (e.g., from the Internet) a ring tune other than a manufacturer's default ring tune, to thereby customize their ring and render the ring of their mobile telephone more distinctive than a manufacturer default ring. A drawback with providing users with the ability to customize their telephone ring tune is that many users do not know how to customize their mobile telephone ring tune, and do not care to work their way through a cryptic menu maze to learn how to select a custom ring tune. As a result, many mobile telephones are left set to a manufacturer-set default ring tune.

Even if a mobile telephone is provided with a distinctive ring, it may still be difficult to identity when it is not ringing, such as when users set their mobile telephones down amongst other mobile telephones, and then are not able readily to visually identify their own mobile telephone from other mobile telephones that may also be placed proximate to their mobile telephone. Conventionally, one may identify his/her own mobile telephone by inspecting the outward appearance of the mobile telephone, but many mobile telephones look similar, particularly to those that are visually impaired. Alternatively, one may inspect unique telephone numbers in a telephone book stored in a mobile telephone, or check the telephone number of the mobile telephone itself. Users may also customize the outward appearance of their mobile telephones using custom covers and the like to provide a ready visual aid to identifying a particular mobile telephone. While inspecting telephone numbers, custom covers, and the like, are helpful aids for persons having good eyesight, such options are of little assistance for visually impaired persons.

Therefore, what is needed is an apparatus and method for assisting users of mobile telephones to be able to identify their respective mobile telephone when it rings to alert a user of an incoming call, or when it is placed amongst other mobile telephones.

SUMMARY

The present invention, accordingly, provides an method for facilitating identification of a telephone, whereby a determination is made whether a custom ring tune has been set for the mobile telephone. In accordance with the present invention, a mobile telephone is provided with code (e.g., software) for determining whether a custom ring tune has been set (e.g., by a user) for the mobile telephone. If a custom ring tune has been set for the mobile telephone, then, upon receipt of a ring generation event, such as an incoming call, power-on of the mobile telephone, holding down of a key for a predetermined period of time, or pressing of a special function key, then the custom ring tune is generated. However, if it is determined that a custom ring tune has not been set for the mobile telephone, then a unique identifier of the mobile telephone is determined, and a ring tune corresponding to the unique identifier is determined. Then, upon receipt of a ring generation event, the ring tune corresponding to the unique identifier is generated.

It may be appreciated that, by the use of the present invention, a mobile telephone, or handset, may be enabled to generate a distinct ring tune without requiring a user to program such a distinct ring tune. The distinct ring tune will facilitate identifying the mobile telephone, particularly if the mobile telephone does not have a display, and/or a user is visually impaired. The invention also permits a user that desires to program a ring tune into his or her mobile telephone to more activate the ring tune to thereby more readily identify his or her mobile telephone.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning wireless communications, mobile telephones, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
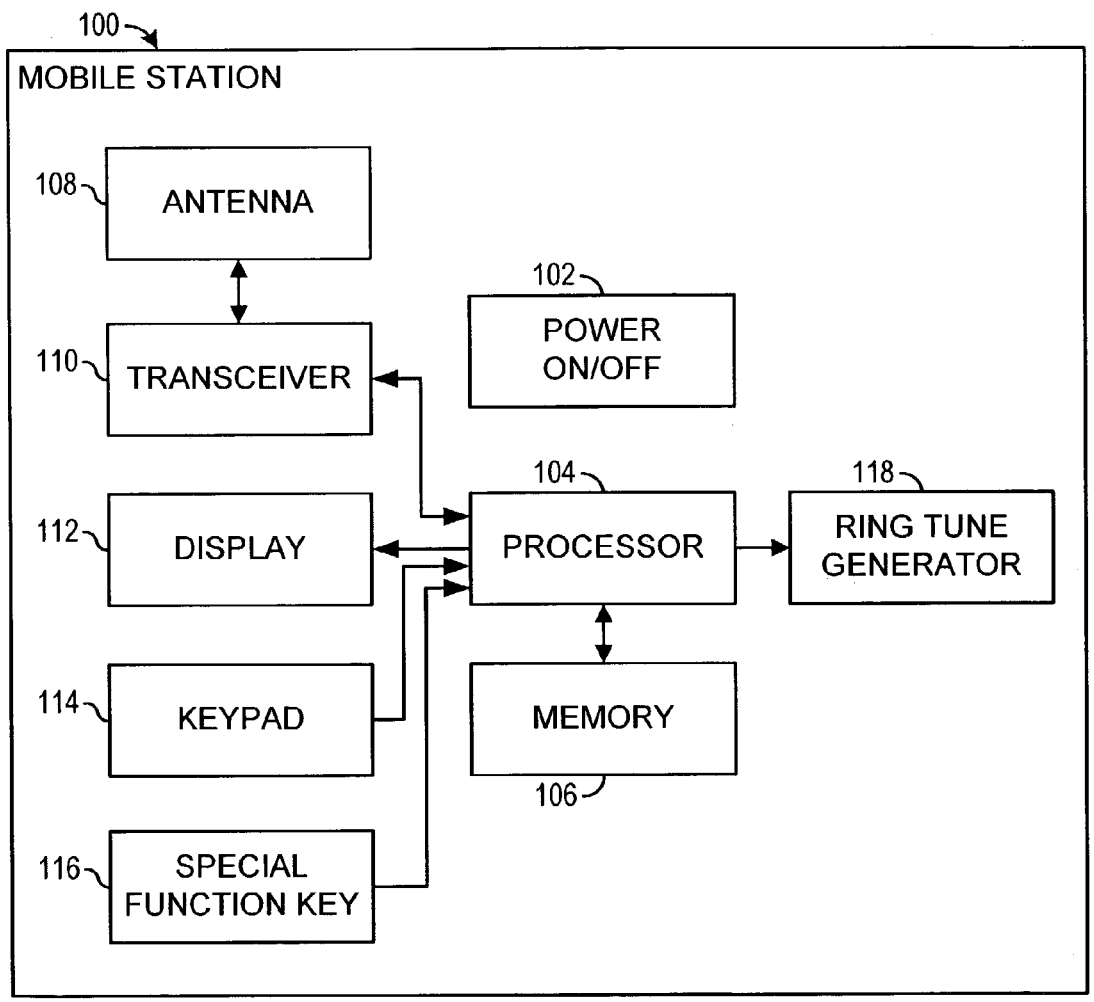
FIG. 1 is a high-level conceptual block diagram of a wireless mobile telephone.

Referring to FIG. 1 of the drawings, the reference numeral 100 generally designates a high-level conceptual block diagram of a wireless radio communications device, referred to herein as a mobile telephone, effective for communicating with antenna structures (not shown) constituting a cellular wireless telephone network in a manner well-known in the art. The mobile telephone 100 includes a power switch 100 for activating operating power to the mobile telephone. A processor 104 is provided for effectuating operations of the mobile telephone 100, and includes data storage device, or memory, 106 operatively interconnected thereto. An antenna 108 is connected via a transceiver 110 to the processor 104 for enabling the mobile telephone 100 to transmit and receive radio communication signals to and from antenna structures constituting the cellular wireless telephone network. A display 112 is connected to the processor 104 for displaying to a user (not shown) output generated by the processor 104, and a keypad 114 is connected to the processor 104 for enabling a user to enter data to the processor 104. A special function key 116 is optionally connected to the mobile telephone 100 for purposes discussed below. A ring tune generator 118, effective for generating an audible ring tune, preferably via a conventional speaker, is connected to the processor 104. The mobile telephone 100, including a number of other components connected thereto, are considered to be well-known in the art and will, therefore, not be discussed in further detail herein, except insofar as necessary to describe the present invention.

Figure 2:
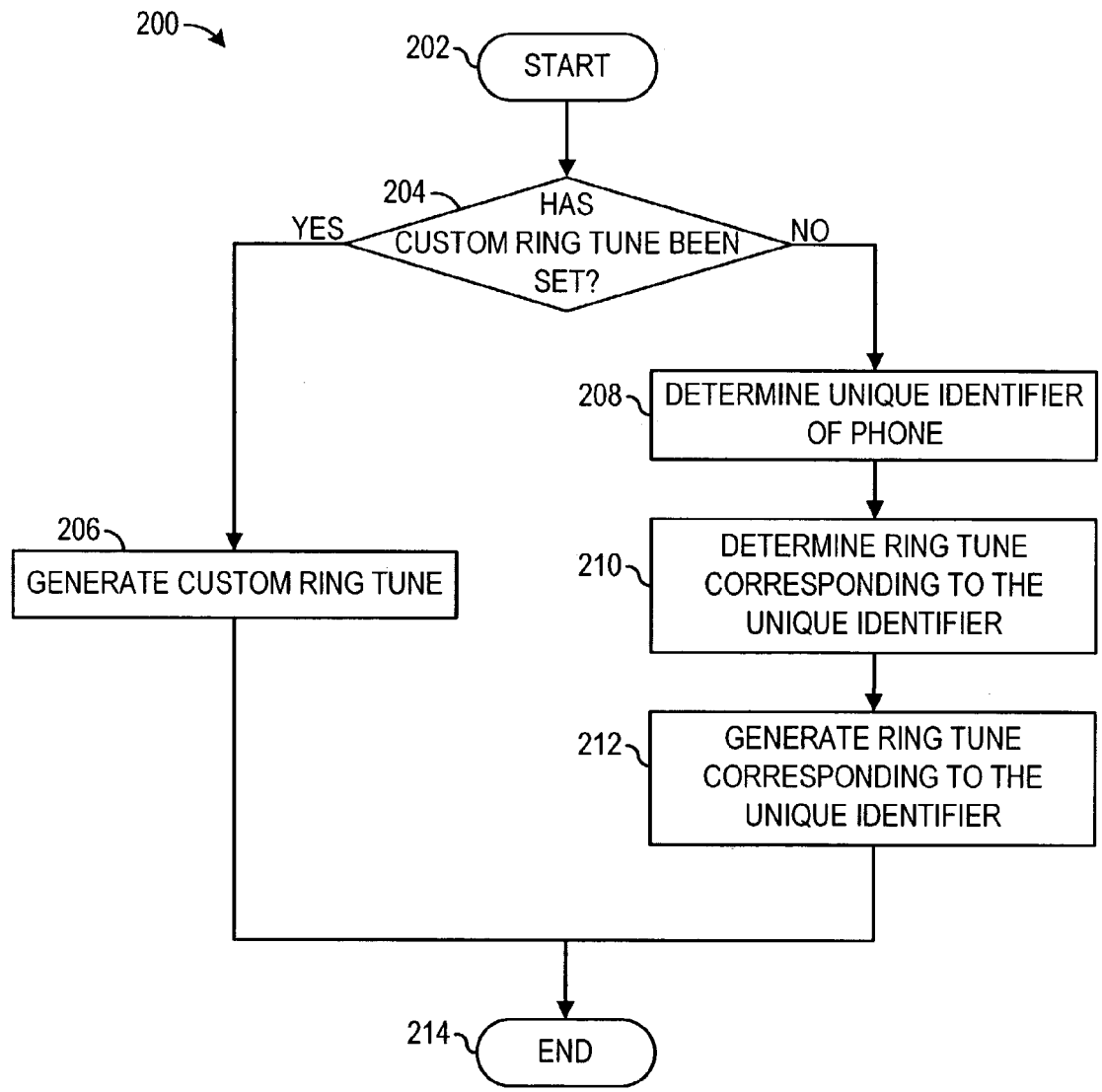
FIG. 2 depicts a flow chart illustrating control logic embodying features of the present invention for generating a distinctive ring tune.

FIG. 2 depicts a flowchart 200 of control logic implemented by the mobile telephone 100 for generating distinct audible ring tunes effective for facilitating identification of a mobile telephone in accordance with the present invention. In step 202, the process of generating a ring tune is initiated, and execution proceeds to step 204, wherein a determination is made whether a custom ring tune has been set in the mobile telephone 100 by a user (not shown). A custom ring tune may be set in any of a number of convention manners, such as by selecting another ring tune provided by a manufacturer of a mobile telephone in the mobile telephone 100, or by downloading a ring tune from the Internet. If it is determined in step 204 that a user has set a custom ring tune, then execution proceeds to step 206 in which the custom ring tune is generated in a conventional manner via the ring tune generator 118.

If, in step 204, it is determined that a custom ring tune has not been set, then execution proceeds to step 208 in which a unique identifier of the mobile telephone 100 is determined. Such unique identifier may be determined from an attribute that is unique to the mobile telephone, such as the mobile telephone's Number Assignment Module (NAM), Electronic Serial Number (ESN), assigned telephone number, or the like. The attribute from which the unique identifier is determined is preferably characterized as being not subject to change as a result of a mobile telephone system change, such as a reset due to a power failure, re-programming (also referred to as re-flash), and the like, to thereby insure that a default ring tune does not change.

In step 210, the processor 104 determines a ring tune corresponding the unique identifier, or a portion thereof, determined in step 208. By way of example, and limitation, 10 ring tunes may be stored in the memory 106 of the mobile telephone 100, and each ring tune may be assigned a number, referred to herein as a ring tune identification (ID) which, by way of example, may be based on the sequence order of the ring tune as it is stored in memory and, for the purpose of illustration herein, may be between 1 and 10, inclusive. Each of the ring tune ID's and, hence, ring tunes, may then be directly correlated to a least significant digit of the mobile telephone unique identifier number. In step 212, the ring tune generator 118 generates the ring tune corresponding to the unique identifier of the mobile telephone. Execution from steps 206 and 212 is terminated at step 214.

Figure 3:
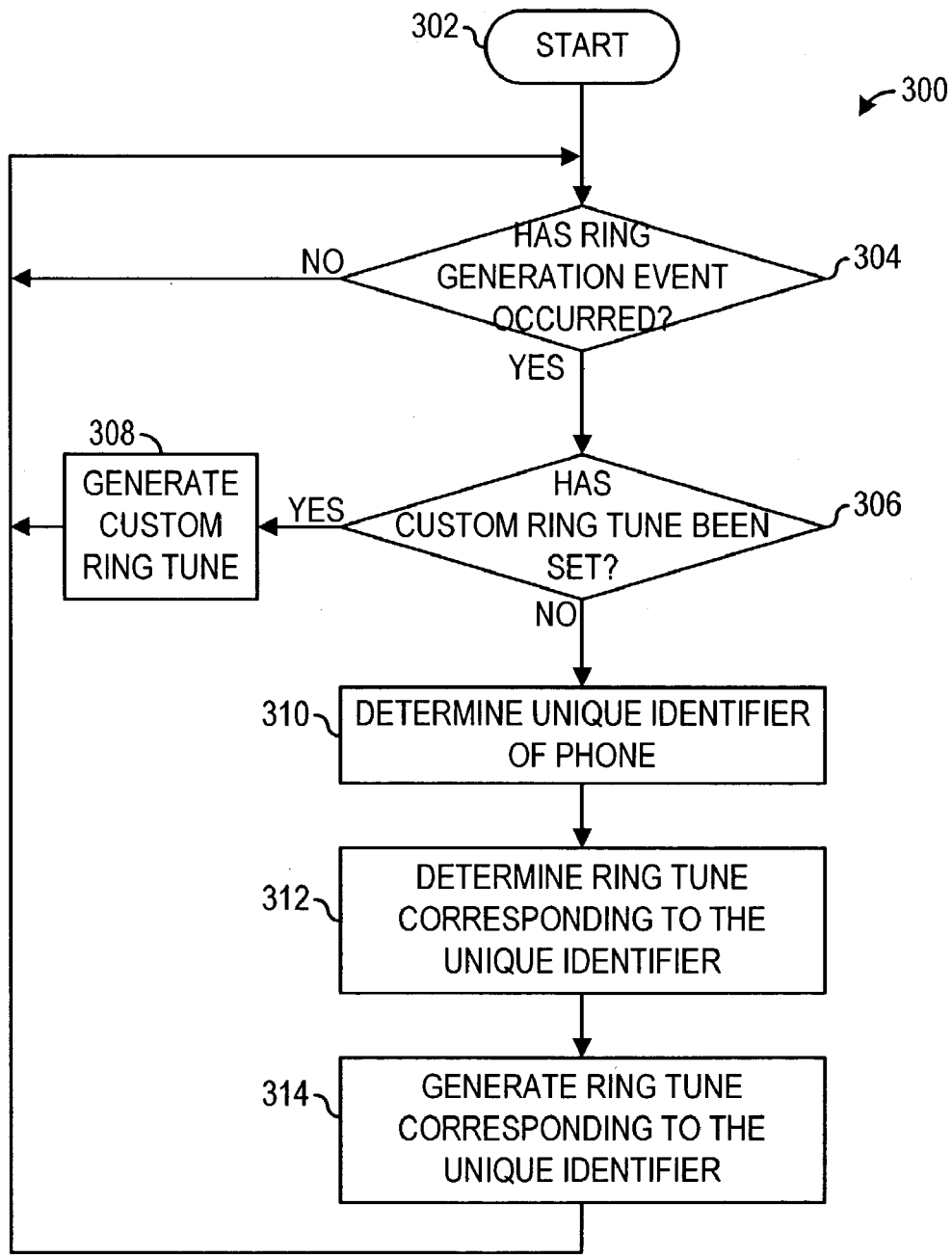
FIG. 3 depicts a flow chart illustrating control logic embodying features of the present invention for generating a distinctive ring tune upon receipt of a ring generation event.

FIG. 3 depicts a flowchart 300 of control logic implemented by the mobile telephone 100 for generating distinct audible ring tunes effective for facilitating identification of a mobile telephone in response to an ring generation event in accordance with the present invention. Beginning at step 302, execution proceeds to step 304, wherein a determination is made whether a ring generation event has been received by the processor 104. By way of example, a ring generation event may include any event for which an audible alert is desired, such as an incoming call, holding down of a key on the keypad 114 for a prolonged period of time (e.g., 5 seconds), pressing the special function key 116, and/or by pressing the power on/off key 102.

If, in step 304, it is determined that a ring generation event has not occurred, then step 304 is repeated. It may be appreciated that step 304 is preferably executed as an operation of a state machine, which state machine is preferably configured as a client in a client-server architecture, in a manner well known to person having ordinary skill in the art based upon a reading of the present description. If, in step 304, it is determined that a ring generation event has occurred, then execution proceeds to step 306. Steps 306–314 are substantially similar to respective steps 204–212 discussed above with respect to FIG. 2 and, therefore, will not be described in further detail herein. However, it is noted that upon completion of either of step 308 or step 314, execution is not terminated, but rather returns to step 304.

Figure 4:
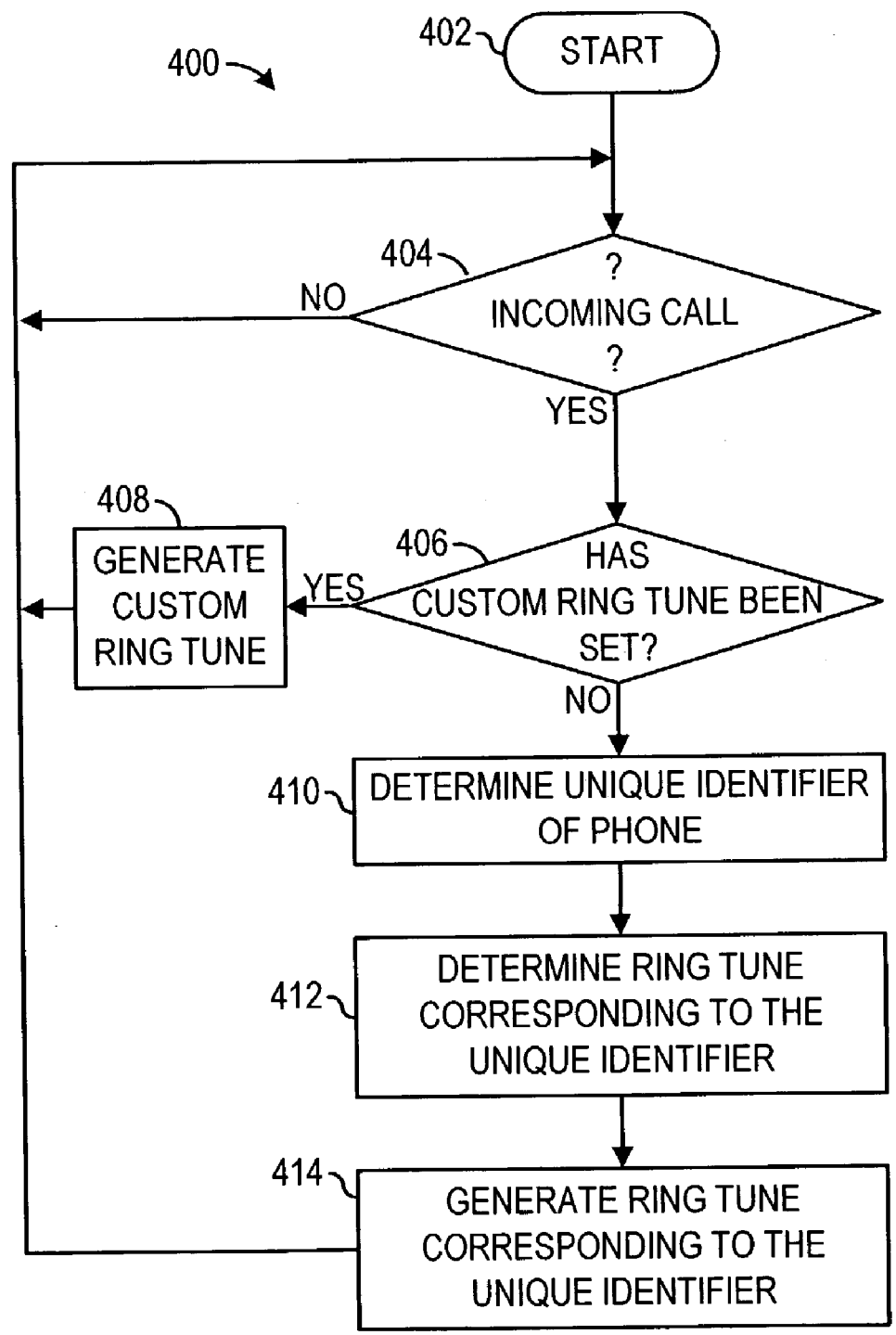
FIG. 4 depicts a flow chart illustrating control logic embodying features of the present invention for generating a distinctive ring tune in response to receipt of an incoming call.

FIG. 4 depicts a flowchart 400 of control logic implemented by the mobile telephone 100 for generating distinct audible ring tunes effective for facilitating identification of a mobile telephone in response to an ring generation event in accordance with the present invention. Beginning at step 402, the mobile telephone 100 is powered on, and execution proceeds to step 404, wherein a determination is made whether there is an incoming call. If it is determined that there is an incoming call, then execution proceeds to step 406; otherwise, step 404 is repeated. It may be appreciated that step 404 is preferably executed as an operation of a state machine, which state machine is preferably configured as a client in a client-server architecture, in a manner well known to person having ordinary skill in the art based upon a reading of the present description.

Steps 406–414 are substantially to respective steps 204–212 discussed above with respect to FIG. 2 and, therefore, will not be described in further detail herein. However, it is noted that upon completion of either step 408 or step 414, rather than terminating execution, execution returns to step 404.

Figure 5:
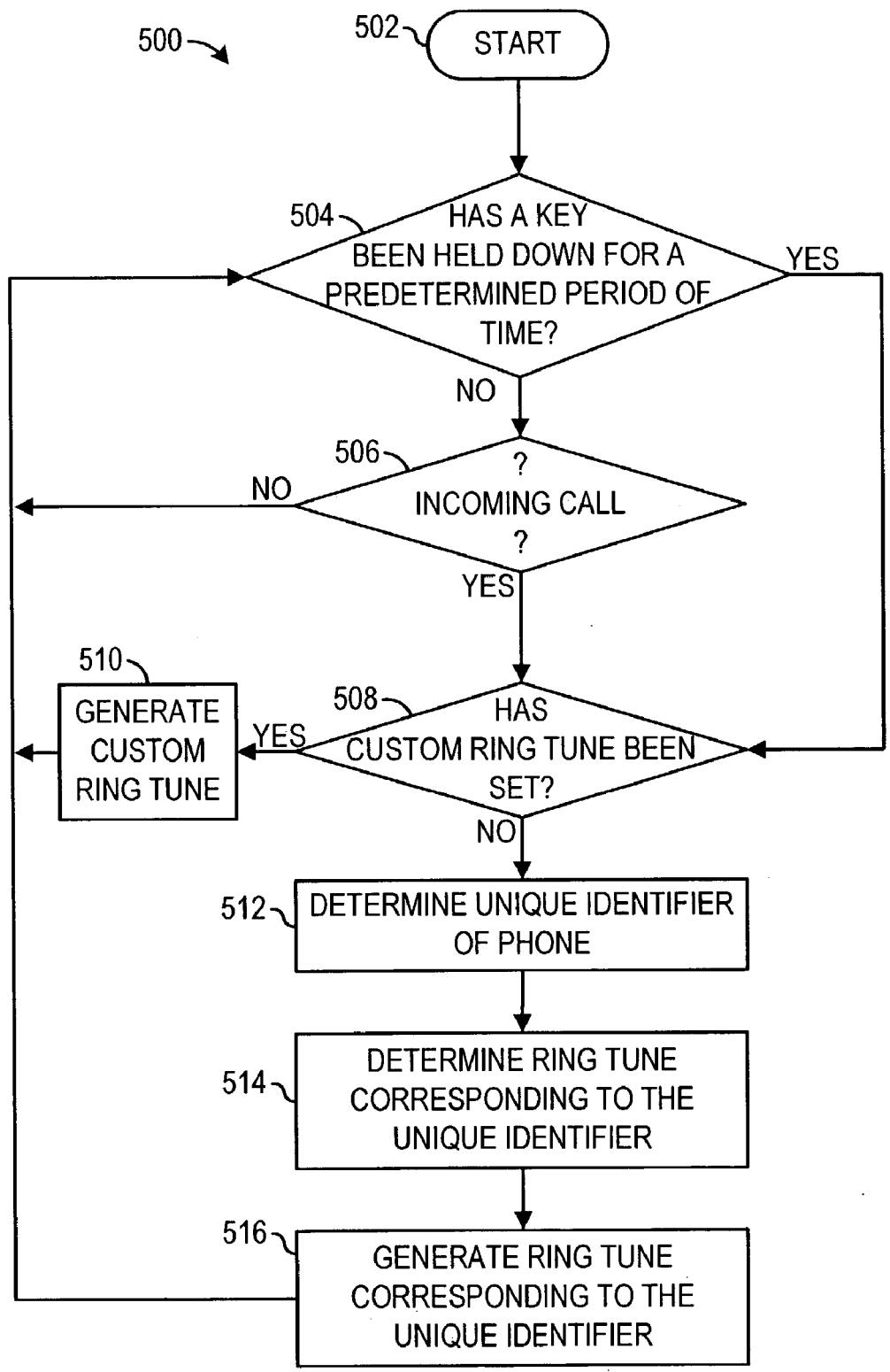
FIG. 5 depicts a flow chart illustrating control logic embodying features of the present invention for generating a distinctive ring tune in response to a prolonged keypress, or receipt of an incoming call.

FIG. 5 depicts a flowchart 500 of control logic implemented by the mobile telephone 100 for generating distinct audible ring tunes effective for facilitating identification of a mobile telephone in response to an ring generation event in accordance with the present invention. Beginning at step 502, the mobile telephone 100 is powered on, and execution proceeds to step 504, wherein a determination is made whether a key on the keypad 114 has been pressed and held for a predetermined period of time, such as about five seconds. If it is determined that a key on the keypad 114 has been pressed and held for a predetermined period of time, then execution proceeds to step 508; otherwise, execution proceeds to steps 506–516, which are substantially similar to respective steps 404–414, discussed above with respect to FIG. 4 and, therefore, will not be described in further detail herein. However, it is noted that upon completion of either step 510 or step 516, execution returns to step 504.

It may be appreciated that steps 504 and 506 are preferably executed as operations of a state machine, which state machine is preferably configured as a client in a client-server architecture, in a manner well known to person having ordinary skill in the art based upon a reading of the present description.

Figure 6:
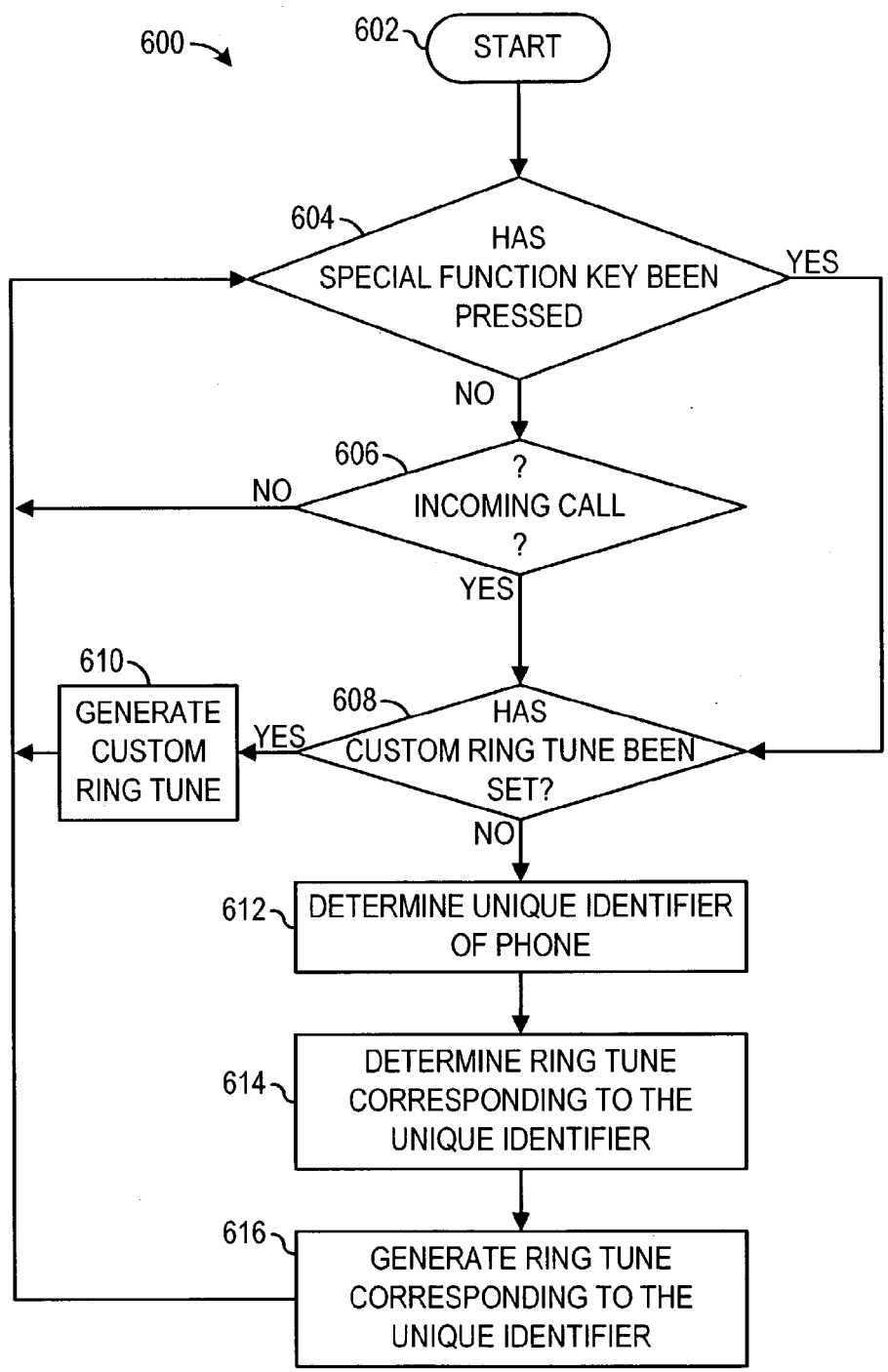
FIG. 6 depicts a flow chart illustrating control logic embodying features of the present invention for generating a distinctive ring tune in response to pressing of a special function key, or receipt of an incoming call.

If the mobile telephone 100 is provided with a special function key 116, then FIG. 6 depicts a flowchart 600 of control logic implemented by the mobile telephone 100 for generating distinct audible ring tunes effective for facilitating identification of a mobile telephone in response to an ring generation event in accordance with the present invention. Beginning at step 602, execution proceeds to step 604, wherein a determination is made whether the special function key 116 has been pressed. If it is determined that the special function key 116 has been pressed, then execution proceeds to step 608, discussed below; otherwise, execution proceeds to step 606.

Steps 606–616 are substantially similar to respective steps 404–414, discussed above with respect to FIG. 2 and, therefore, will not be described in further detail herein. However, it is noted that upon completion of either step 610 or step 616, execution returns to step 604.

It may be appreciated that steps 604 and 606 are preferably executed as operations of a state machine, which state machine is preferably configured as a client in a client-server architecture, in a manner well known to person having ordinary skill in the art based upon a reading of the present description.

Figure 7:
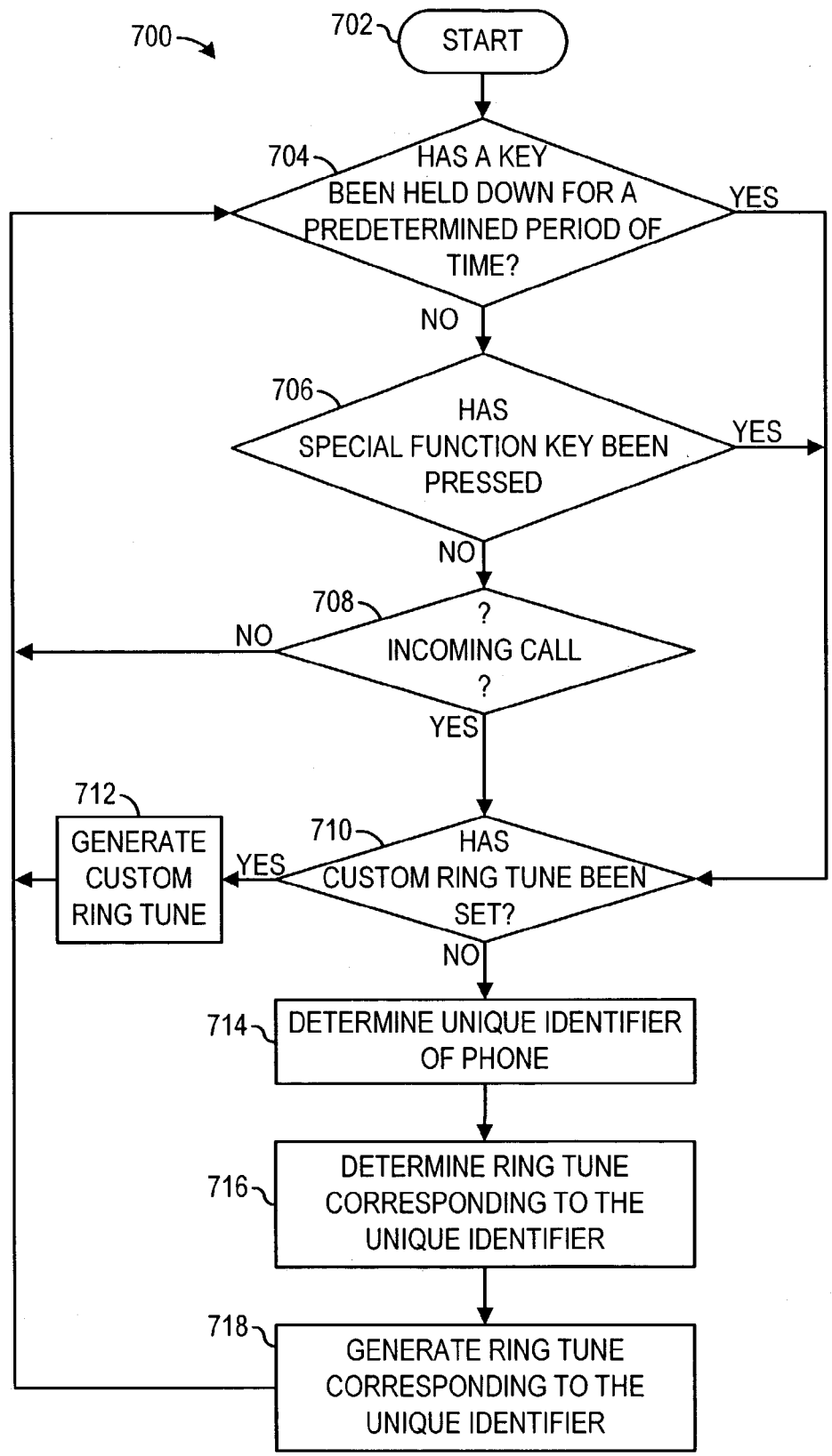
FIG. 7 depicts a flow chart illustrating control logic embodying features of the present invention for generating a distinctive ring tune in response to pressing of a special function key, a prolonged keypress, or receipt of an incoming call.

FIG. 7 depicts a flowchart 700 of control logic implemented by the mobile telephone 100 for generating distinct audible ring tunes effective for facilitating identification of a mobile telephone in response to an ring generation event in accordance with the present invention. Beginning at step 702, the mobile telephone 100 is powered on, and execution proceeds to step 704, wherein a determination is made whether a key on the keypad 114 has been pressed and held for a predetermined period of time, such as about five seconds. If it is determined that a key on the keypad 114 has been pressed and held for a predetermined period of time, then execution proceeds to step 710; otherwise, execution proceeds to steps 706–718, which are substantially similar to respective steps 604–616, discussed above with respect to FIG. 6 and, therefore, will not be described in further detail herein. However, it is noted that upon completion of either step 712 or 718, execution returns to step 704.

It may be appreciated that steps 704, 706, and 708 are preferably executed as operations of a state machine, which state machine is preferably configured as a client in a client-server architecture, in a manner well known to person having ordinary skill in the art based upon a reading of the present description.

Figure 8:
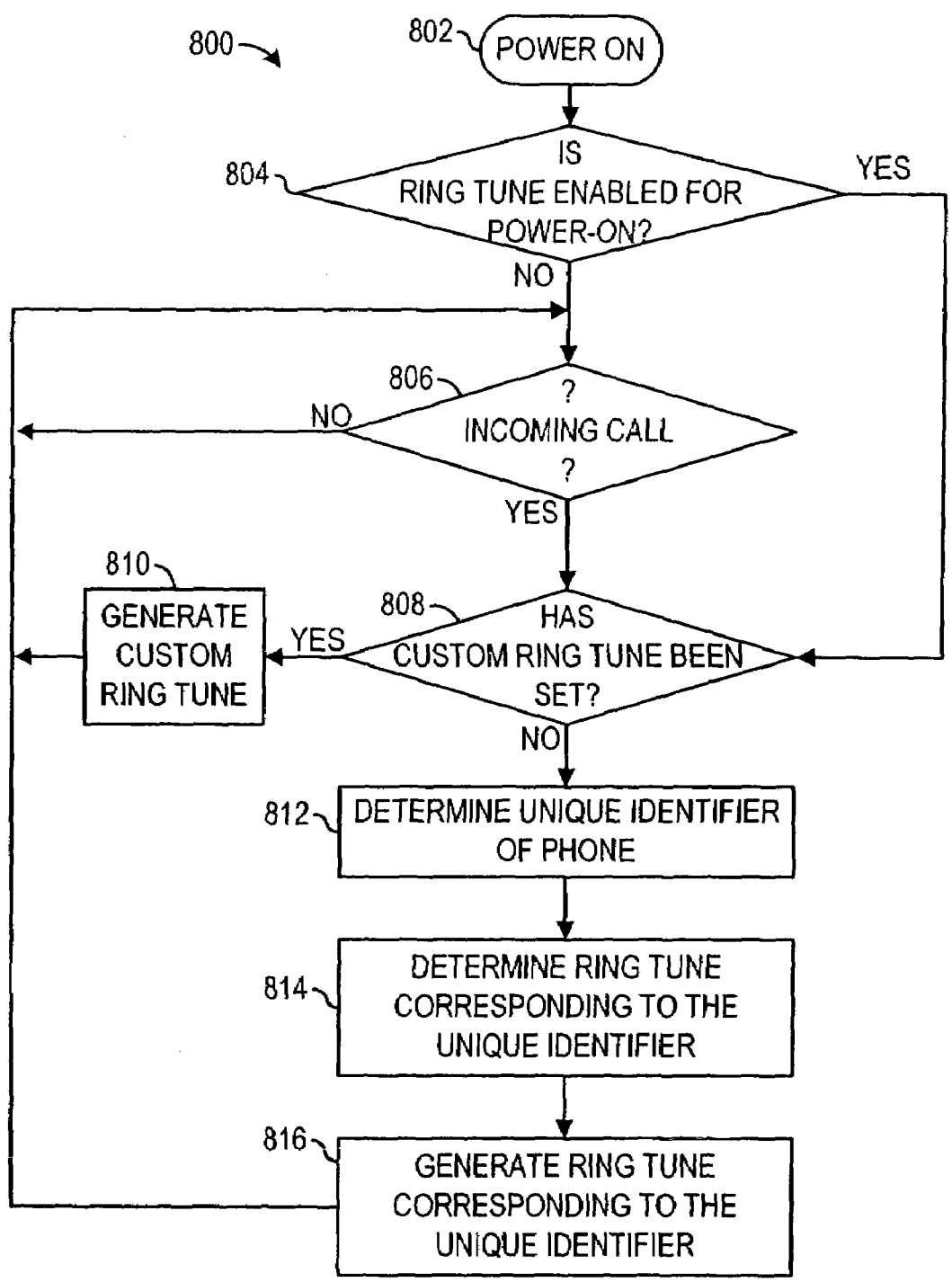
FIG. 8 depicts a flow chart illustrating control logic embodying features of the present invention for generating a distinctive ring tune in response to power-on of the mobile telephone, pressing of a special function key, a prolonged keypress, or receipt of an incoming call.

FIG. 8 depicts a flowchart 800 of control logic implemented by the mobile telephone 100 for generating distinct audible ring tunes effective for facilitating identification of a mobile telephone in response to an ring generation event in accordance with the present invention. Beginning at step 802, the mobile telephone 100 is powered on, and execution proceeds to step 804, wherein a determination is made whether the generation of an audible ring tune is enabled for power-on of the mobile telephone 100. A ring tune may be enabled for power-on by a user via conventional means, e.g., menu-driven prompts on the display 112, or may not be provided as an option, thereby effectively rendering the generation of a ring tune on power-on permanently disabled, in which latter case step 804 may be bypassed or removed.

If, in step 804, it is determined that the generation of an audible ring tune is enabled for power-on of the mobile telephone 100, then execution proceeds to step 808; otherwise, execution proceeds to steps 806–816, which are substantially similar to respective steps 404–414, discussed above with respect to FIG. 4 and, therefore, will not be described in further detail herein. However, it is noted that upon completion of either step 810 or step 816, execution returns to step 806.

It may be appreciated that steps 806 is preferably executed as an operation of a state machine, which state machine is preferably configured as a client in a client-server architecture, in a manner well known to person having ordinary skill in the art based upon a reading of the present description.

Figure 9:
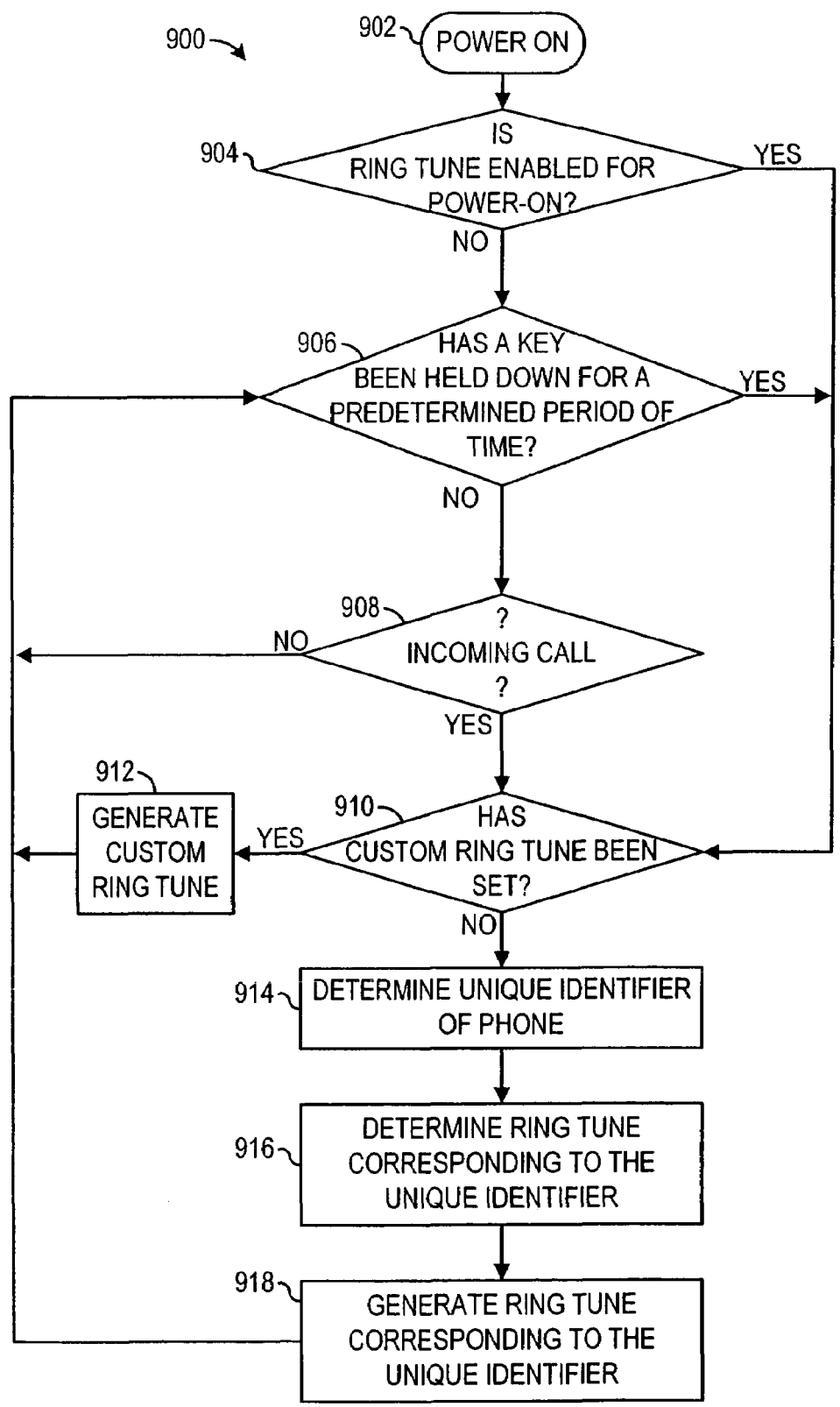
FIG. 9 depicts a flow chart illustrating control logic embodying features of the present invention for generating a distinctive ring tune in response to power-on of the mobile telephone, a prolonged keypress, or receipt of an incoming call.

FIG. 9 depicts a flowchart 900 of control logic implemented by the mobile telephone 100 for generating distinct audible ring tunes effective for facilitating identification of a mobile telephone in response to an ring generation event in accordance with the present invention. Beginning at step 902, the mobile telephone 100 is powered on, and execution proceeds to step 904, wherein a determination is made whether the generation of an audible ring tune is enabled for power-on of the mobile telephone 100, as in step 804, discussed above with respect to FIG. 8.

If, in step 904, it is determined that the generation of an audible ring tune is enabled for power-on of the mobile telephone 100, then execution proceeds to step 910; otherwise, execution proceeds to steps 906–918, which are substantially similar to respective steps 504–516, discussed above with respect to FIG. 5 and, therefore, will not be described in further detail herein. However, it is noted that upon completion of either step 912 or step 918, execution returns to step 906.

It may be appreciated that steps 906 and 908 are preferably executed as an operation of a state machine, which state machine is preferably configured as a client in a client-server architecture, in a manner well known to person having ordinary skill in the art based upon a reading of the present description.

Figure 10:
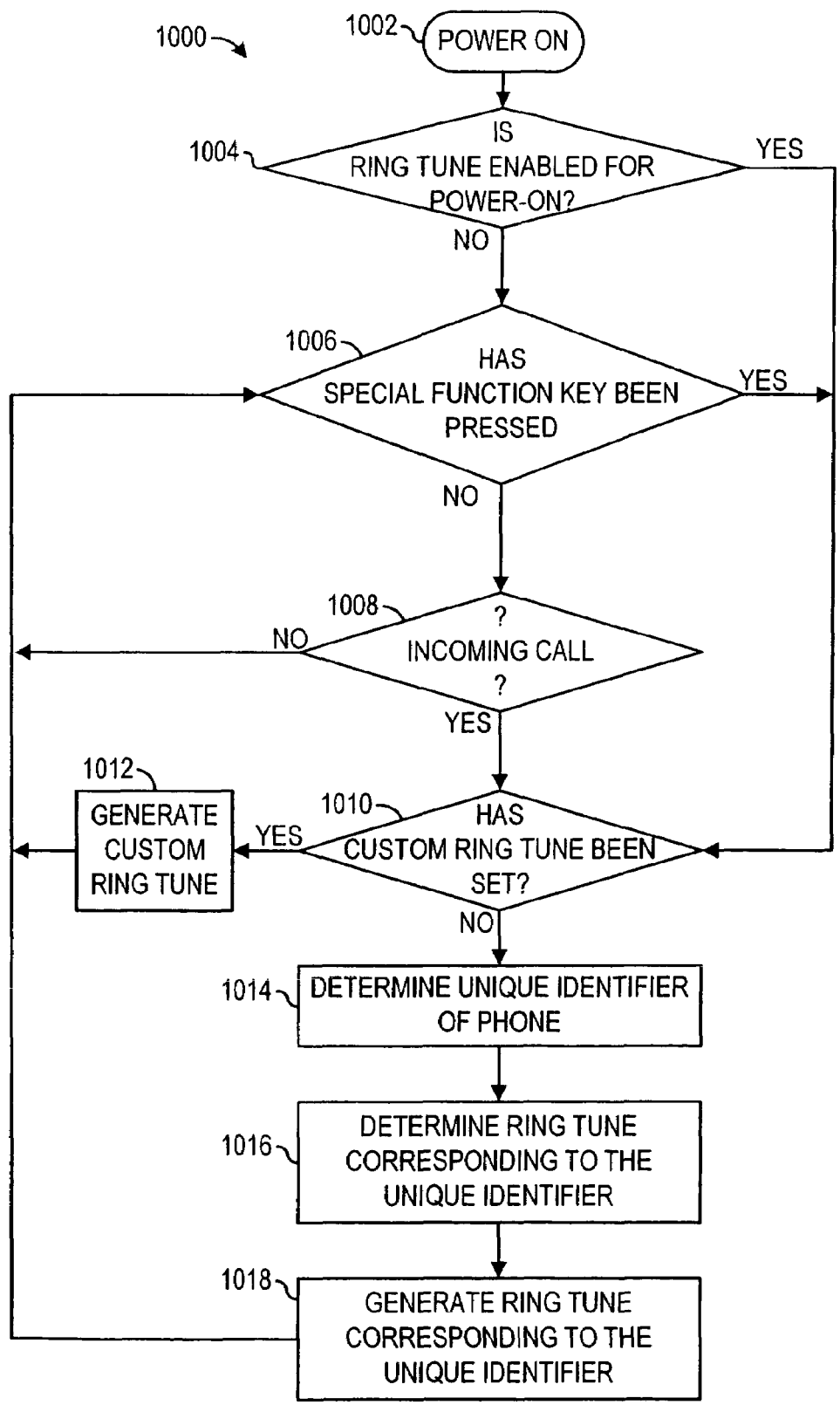
FIG. 10 depicts a flow chart illustrating control logic embodying features of the present invention for generating a distinctive ring tune in response to power-on of the mobile telephone, pressing of a special function key, or receipt of an incoming call.

FIG. 10 depicts a flowchart 1000 of control logic implemented by the mobile telephone 100 for generating distinct audible ring tunes effective for facilitating identification of a mobile telephone in response to an ring generation event in accordance with the present invention. Beginning at step 1002, the mobile telephone 100 is powered on, and execution proceeds to step 1004, wherein a determination is made whether the generation of an audible ring tune is enabled for power-on of the mobile telephone 100, as in step 804, discussed above with respect to FIG. 8.

If, in step 1004, it is determined that the generation of an audible ring tune is enabled for power-on of the mobile telephone 100, then execution proceeds to step 1010; otherwise, execution proceeds to steps 1006–1018, which are substantially similar to respective steps 604–616, discussed above with respect to FIG. 6 and, therefore, will not be described in further detail herein. However, it is noted that upon completion of either step 1012 or step 1018, execution returns to step 1006.

It may be appreciated that steps 1006 and 1008 are preferably executed as operations of a state machine, which state machine is preferably configured as a client in a client-server architecture, in a manner well known to person having ordinary skill in the art based upon a reading of the present description.

Figure 11:
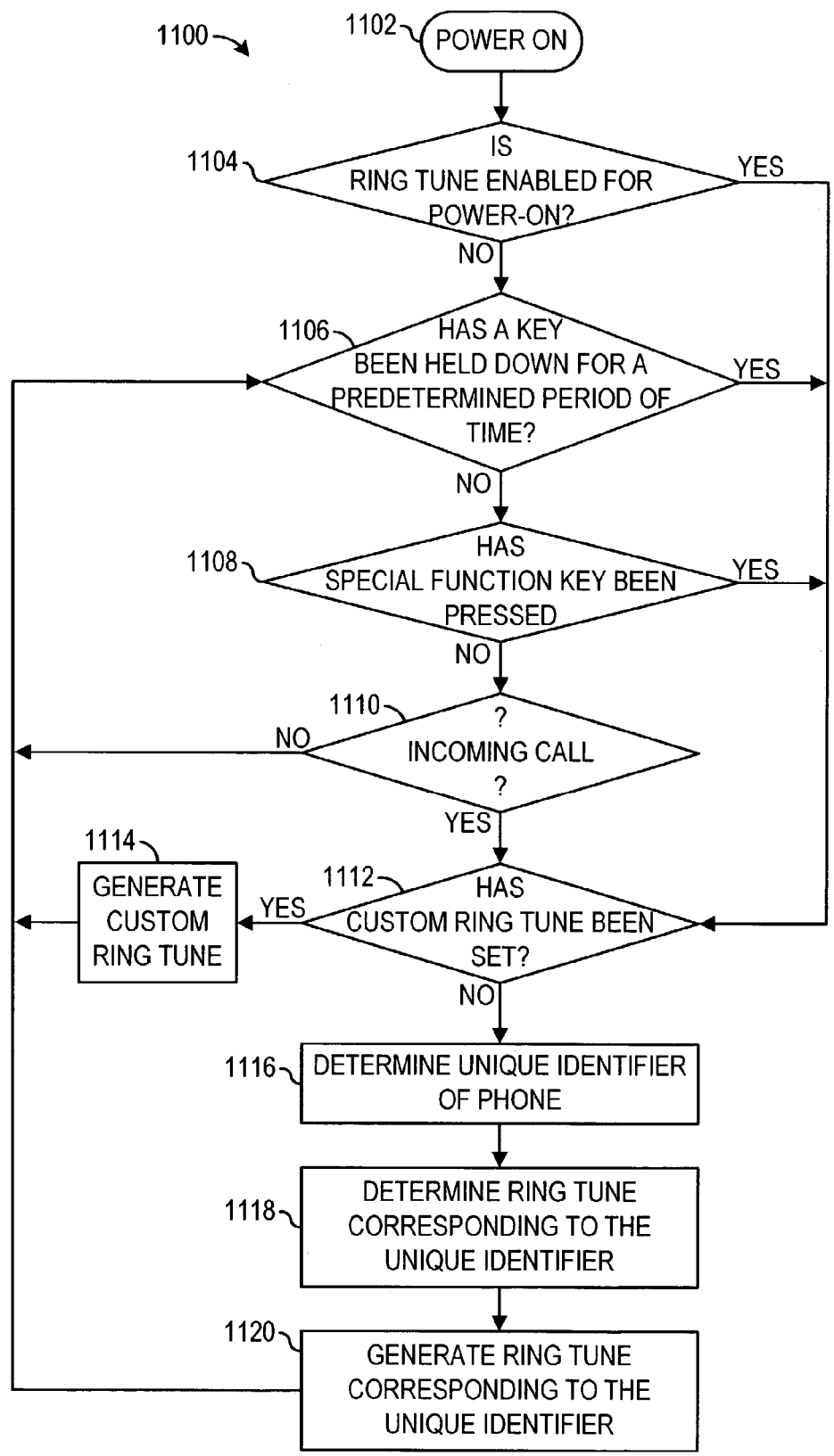
FIG. 11 depicts a flow chart illustrating control logic embodying features of the present invention for generating a distinctive ring tune in response to power-on of the mobile telephone, pressing of a special function key, a prolonged keypress, or receipt of an incoming call.

FIG. 11 depicts a flowchart 1100 of control logic implemented by the mobile telephone 100 for generating distinct audible ring tunes effective for facilitating identification of a mobile telephone in response to an ring generation event in accordance with the present invention. Beginning at step 1102, the mobile telephone 100 is powered on, and execution proceeds to step 1104, wherein a determination is made whether the generation of an audible ring tune is enabled for power-on of the mobile telephone 100, as in step 804, discussed above with respect to FIG. 8.

If, in step 1104, it is determined that the generation of an audible ring tune is enabled for power-on of the mobile telephone 100, then execution proceeds to step 1112; otherwise, execution proceeds to steps 1106–1020, which are substantially similar to respective steps 704–718, discussed above with respect to FIG. 7 and, therefore, will not be described in further detail herein. However, it is noted that upon completion of either step 1114 or step 1120, execution returns to step 1106.

It may be appreciated that steps 1106, 1108, and 1110 are preferably executed as operations of a state machine, which state machine is preferably configured as a client in a client-server architecture, in a manner well known to person having ordinary skill in the art based upon a reading of the present description.

Figure 12:
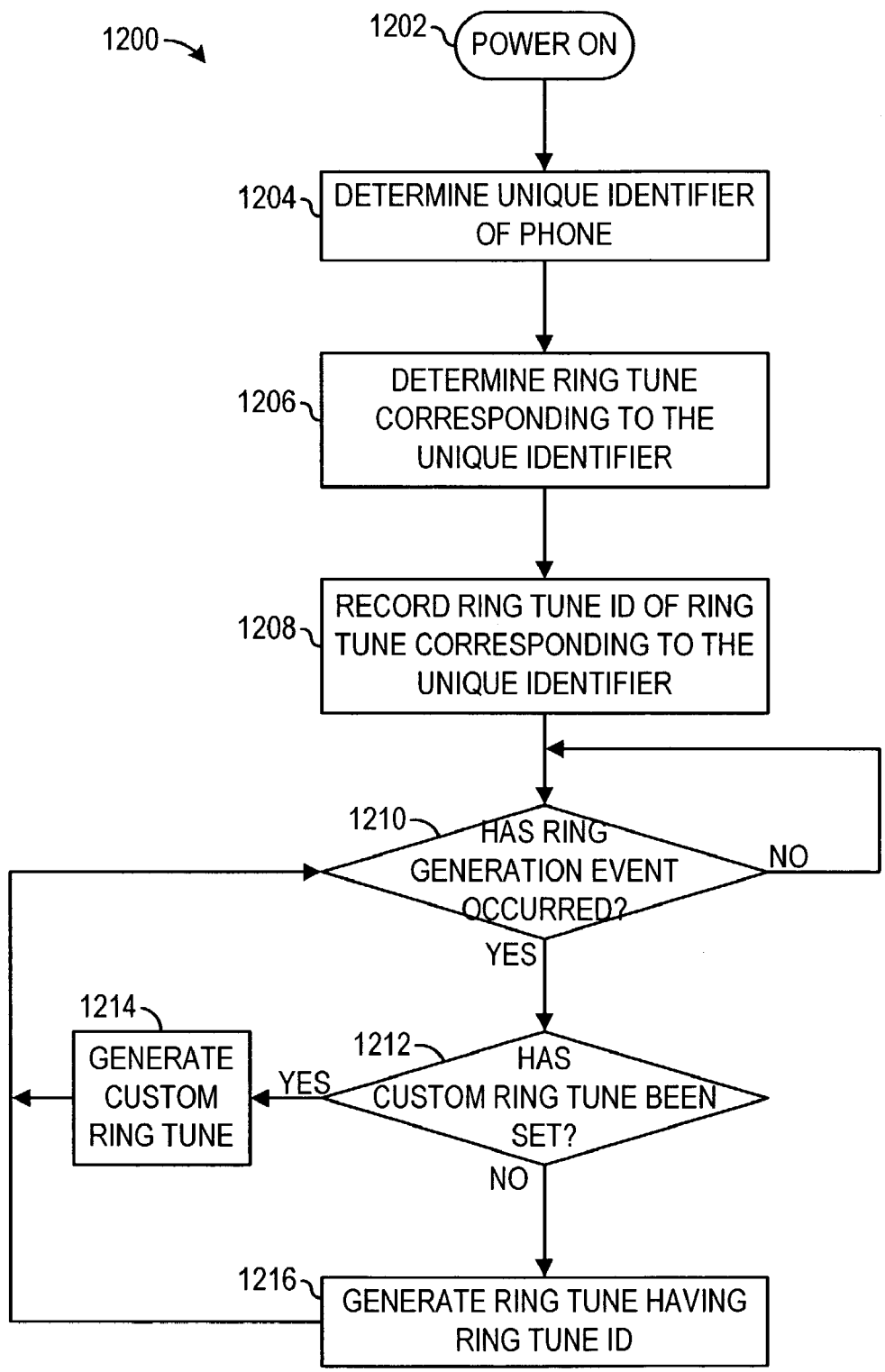
FIG. 12 depicts a flow chart illustrating control logic embodying features of the present invention for determining and recording a distinctive ring tune ID of a ring tune and, upon receipt of a ring generation event, generating a ring tune having the ring tune ID if a custom ring tune has not been set.

FIG. 12 depicts a flowchart 1200 of control logic implemented by the mobile telephone 100 for recording a ring tune ID of a distinct audible ring tune for facilitating identification of a mobile telephone in response to an ring generation event in accordance with the present invention. Beginning at step 1202, execution proceeds to step 1204 in which a unique identifier of the mobile telephone 100 is determined, as described above with respect to step 208 of FIG. 2. In step 1206, the processor 104 determines a ring tune corresponding the unique identifier, or a portion thereof, determined in step 208, as described above with respect to step 210 of FIG. 2. In step 1208, the ring tune identification (ID) of the ring corresponding to the unique identifier determined in step 1206 is recorded in the memory 106 of the mobile telephone 100.

In step 1210, a determination is made whether a ring generation event has been received by the processor 104, as described above with respect to step 304 of FIG. 3. Step 1210 is preferably executed as an operation of a state machine, which state machine is preferably configured as a client in a client-server architecture, in a manner well known to person having ordinary skill in the art based upon a reading of the present description. If it is determined that a ring generation event has not been received by the processor 104, then step 1210 is repeated; otherwise, execution proceeds to step 1212.

In step 1212, a determination is made whether a custom ring tune has been set in the mobile telephone 100 by a user, as described above with respect to step 204 of FIG. 2. If, in step 1212, a determination is made that a custom ring tune has been set, then execution proceeds to step 1214 in which the custom ring tune is generated, and execution returns to step 1210. If, in step 1212, it is determined that a custom ring tune has not been set, then execution proceeds to step 1216, in which the ring tune having the ring tune ID recorded in the memory 106 in step 1208 is generated. Following step 1216, execution returns to step 1210.

Figure 13:
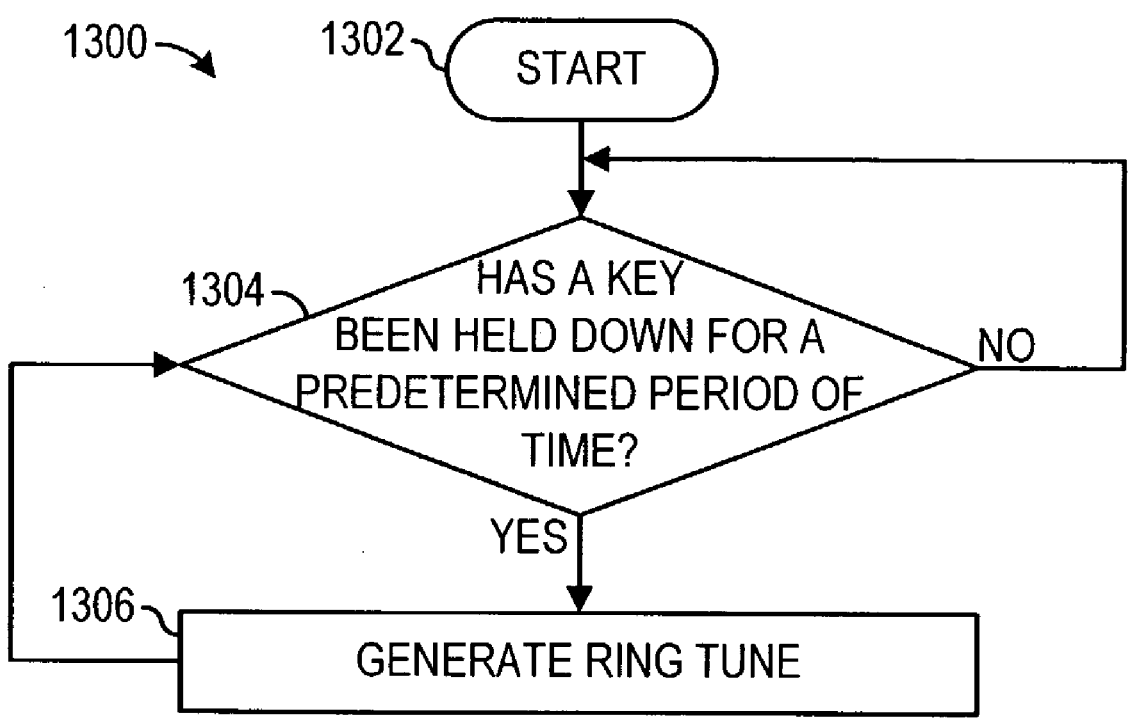
FIG. 13 depicts a flow chart illustrating control logic embodying features of the present invention for generating a ring tune in response to a prolonged keypress.

FIG. 13 depicts a flowchart 1300 of control logic implemented by the mobile telephone 100 for generating an audible ring tune for facilitating identification of a mobile telephone in accordance with the present invention. Beginning at step 1302, execution proceeds to step 1304 in which a determination is made whether a key on the keypad 114 has been pressed and held for a predetermined period of time, such as about five seconds. If it is determined that a key on the keypad 114 has been pressed and held for such a predetermined period of time, then execution proceeds to step 1306, in which a ring tune (either custom or factory default) is generated. If, in step 1304, it is not determined that a key on the keypad 114 has been pressed and held for such a predetermined period of time, then step 1304 is repeated. It may be appreciated that step 1304 is preferably executed as an operation of a state machine, which state machine is preferably configured as a client in a client-server architecture, in a manner well known to person having ordinary skill in the art based upon a reading of the present description.

Figure 14:
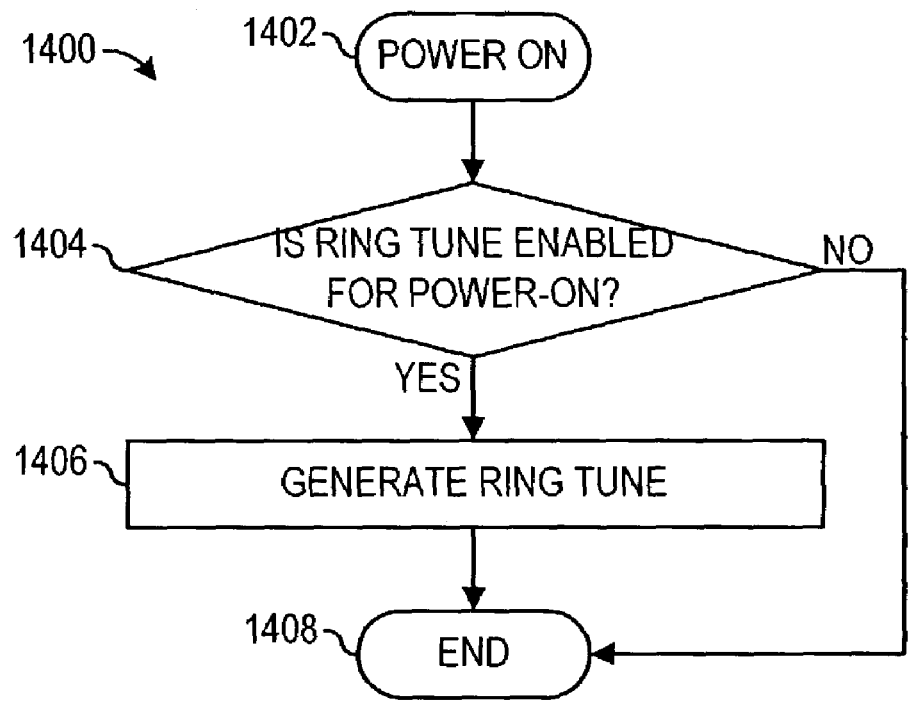
FIGS. 14 and 15 depict flow charts illustrating control logic embodying features of the present invention for generating a ring tune in response to power up of mobile telephone.

FIG. 14 depicts a flowchart 1400 of control logic implemented by the mobile telephone 100 for generating an audible ring tune for facilitating identification of a mobile telephone in accordance with the present invention. Beginning at step 1402, the mobile telephone 100 is powered-on and execution proceeds to step 1404 wherein a determination is made whether the generation of an audible ring tune is enabled for power-on of the mobile telephone 100, as described above with respect to step 804. If it is determined that the generation of an audible ring tune is enabled for power-on of the mobile telephone 100, then execution proceeds to step 1406, in which a ring tune (either custom or factory default) is generated. If, in step 1404, it is not determined that the generation of an audible ring tune is enabled for power-on of the mobile telephone 100, then execution terminates with respect to the logic depicted by the flow chart 1400 of FIG. 14.

Figure 15:
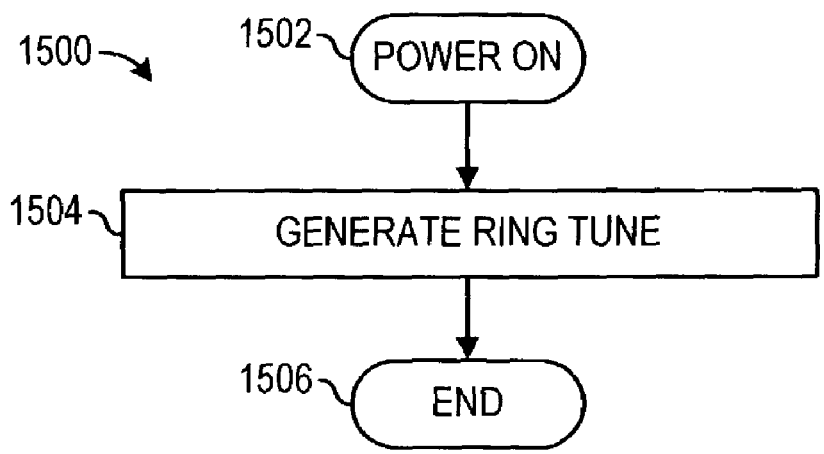

FIG. 15 depicts a flowchart 1500 of control logic implemented by the mobile telephone 100 for generating an audible ring tune for facilitating identification of a mobile telephone in accordance with the present invention. Beginning at step 1502, the mobile telephone 100 is powered-on and execution proceeds to step 1504. At step 1504, execution terminates with respect to the logic depicted by the flow chart 1500 of FIG. 15.

By the use of the present invention, a mobile telephone, or handset, is enabled to generate a distinct ring tune without requiring a user to program such a distinct ring tune. The distinct ring tune will facilitate identifying the mobile telephone, particularly if the mobile telephone does not have a display, and/or a user is visually impaired. The invention also permits a user that desires to program a ring tune into his or her mobile telephone to more easily activate the ring tune to thereby more readily identify his or her mobile telephone.

It is understood that the present invention may take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for facilitating identification of a communications device, the method comprising steps of:
   determining at the communications device whether a custom ring tune has been set for the communications device;
   upon a determination that the custom ring tune has been set for the communications device, generating the custom ring tune; and
   upon a determination that the custom ring tune has not been set for the communications device:
      determining a unique identifier of the communications device;
      determining a ring tune corresponding to the unique identifier; and
      generating the ring tune corresponding to the unique identifier.

2. The method of claim 1 further comprising the step of awaiting receipt of an incoming call; and wherein the step of determining whether the custom ring tune has been set for the communications device is executed upon said receipt of said incoming call.

3. The method of claim 1 further comprising the step of determining whether a key has been held down for a predetermined period of time; and wherein the step of determining whether the custom ring tune has been set for the communications device is executed upon a determination that the key has been held down for at least a predetermined period of time.

4. The method of claim 1 wherein the step of determining whether the custom ring tune has been set for the communications device is executed when the communications device is powered-on.

5. The method of claim 1 further comprising the step of determining whether the ring tune is enabled for power-on of the communications device; and wherein, if it is determined that the ring tune is enabled for power-on of the communications device, then the step of determining whether the custom ring tune has been set for the communications device is executed when the communications device is powered on.

6. The method of claim 1 further comprising the step of recording a ring tune ID of the ring tune.

7. The method of claim 1 wherein the unique identifier comprises a selected one or more digits of an ESN, NAM or telephone number of the communications device.

8. The method of claim 1 wherein:
   the step of generating the custom ring tune further comprises determining and recording a ring tune ID corresponding to the custom ring tune, awaiting receipt of a ring generation event, and upon receipt of the ring generation event, generating the ring tune having the ring tune ID; and
   the step of generating the ring tune corresponding to the unique identifier further comprises recording a ring tune ID of the ring tune corresponding to the unique identifier, awaiting receipt of a ring generation event, and upon receipt of the ring generation event, generating the ring tune having the ring tune ID.

9. A method for facilitating identification of a communications device, the method comprising steps of:
   determining at the communications device a unique identifier of the communications device;
   determining a ring tune corresponding to the unique identifier;
   recording the ring tune ID of the ring tune corresponding to the unique identifier;

awaiting receipt of a ring generation event;
upon receipt of the ring generation event, determining whether a custom ring tune has been set for the communications device;
upon a determination that the custom ring tune has been set for the communications device, generating the custom ring tune, and repeating the step of awaiting; and
upon a determination that the custom ring tune has not been set for the communications device, generating the ring tune having the ring tune ID, and repeating the step of awaiting.

10. The method of claim 9 wherein
the ring generation event comprises at least one of receipt of an incoming call, holding down of a key for a predetermined period of time, and power -on of the communications device.

11. The method of claim 9 wherein: the ring generation event comprises at least one of receipt of an incoming call, holding down of a key for at 1 east a predetermined period of time, and, if ring tune is enabled for power -on, then power -on of the mobile communications device.

12. A method for facilitating identification of a communications device, the method comprising steps of: awaiting receipt of a ring generation event at the communications device comprising holding down of a key for at least a predetermined period of time; and upon receipt of the ring generation event, determining whether a custom ring tune has been set for the ring generation event; and
  upon determining that the custom ring tune has not been set, performing the steps of:
    determining a unique identifier of the communications device;
    determining a ring tune corresponding to the unique identifier; and
    generating the ring tune corresponding to; the unique identifier.

13. The method of claim 12 wherein the ring generation event further comprises power-on of the communications device.

14. The method of claim 12 further comprising the step of determining whether ring tune is enabled for power-on, and wherein the ring generation event further comprises the power-on of the communications device.

15. A method for facilitating identification of a communications device, the method comprising steps of:
  awaiting receipt of a ring generation event comprising power-on of the communications device; and
  upon receipt of the ring generation event, determining whether a custom ring-tune has
  been set for the ring generation event; and
  upon determining that the custom ring-tune has not been set, performing the steps of:
    determining a unique identifier of the communications device;
    determining a ring tune corresponding to the unique identifier; and
    generating the ring tune corresponding to the unique identifier.

16. The method of claim 15 further comprising the step of determining whether ring tune is enabled for power-on, and wherein the ring generation event further comprises the power-on of the communications device.

17. A communications device comprising:
  a processor;
  an antenna configured for transmitting and receiving radio communications;
  a transceiver operatively interconnecting the antenna to the processor;
  a keypad operatively connected to the processor for input of data to the processor; and
  a memory connected to the processor, the memory comprising:
    program code for determining whether a custom ring tune has been set for the communications device;
    program code, upon a determination that the custom ring tune has been set for the communications device, for generating the custom ring tune; and
    program code, upon a determination that the custom ring tune has not been set for the communications device, for:
      determining a unique identifier of the communications device;
      determining a ring tune corresponding to the unique identifier; and
      generating the ring tune corresponding to the unique identifier.

18. The communications device of claim 17 wherein:
the program code for generating the custom ring tune further comprises program code for determining and recording a ring tune ID corresponding to the custom ring tune, program code for awaiting receipt of a ring generation event, and upon receipt of the ring generation event, program code for generating the ring tune having the ring tune ID; and
the program code for generating the ring tune corresponding to the unique identifier further comprises program code for recording a ring tune ID of the ring tune corresponding to the unique identifier, program code for awaiting receipt of a ring generation event, and upon receipt of the ring generation event, program code for generating the ring tune having the ring tune ID.

19. The communications device of claim 17 wherein:
the program code for generating the custom ring tune further comprises program code for determining and recording a ring tune ID corresponding to the custom ring tune, program code for awaiting receipt of a ring generation event, and upon receipt of the ring generation event, program code for generating the ring tune having the ring tune ID;
the program code for generating the ring tune corresponding to the unique identifier further comprises program code for recording a ring tune ID of the ring tune corresponding to the unique identifier, program code for awaiting receipt of a ring generation event, and upon receipt of the ring generation event, program code for generating the ring tune having the ring tune ID; and
the ring generation event comprises at least one of receipt of an incoming call, holding down of a key for at least a predetermined period of time, and power-on of the communications device.

20. The communications device of claim 17 wherein:
the program code for generating the custom ring tune further comprises program code for determining and recording a ring tune ID corresponding to the custom ring tune, program code for awaiting receipt of a ring generation event, and upon receipt of the ring generation event, program code for generating the ring tune having the ring tune ID;
the program code for generating the ring tune corresponding to the unique identifier further comprises program code for recording a ring tune ID of the ring tune corresponding to the unique identifier, program code for awaiting receipt of a ring generation event, and upon receipt of the ring generation event, program code for generating the ring tune having the ring tune ID; and the ring generation event comprises at least one of receipt of an incoming call, holding down of a key for at least a predetermined period of time, and, if ring tune is enabled for power on, then power-on of the communications device.

21. A communications device comprising:

a first means for determining at the communications device whether a custom ring tune has been set for the communications device;

a second means for generating a custom ring tune upon a determination that the custom ring tune has been set for the communications device; and a third means for, upon a determination that the custom ring tune has not been set for the communications device, determining a unique identifier of the communications device, determining a ring tune corresponding to the unique identifier; and generating the ring tune corresponding to the unique identifier.

22. A computer-readable medium containing computer-executable code for performing the following steps:

determining at the communications device whether a custom ring tune has been set for the communications device;

upon a determination that the custom ring tune has been set for the communications device, generating the custom ring tune; and upon a determination that the custom ring tune has not been set for the communications device:

determining a unique identifier of the communications device;

determining a ring tune corresponding to the unique identifier; and generating the ring tune corresponding to the unique identifier.

* * * * *